United States Patent [19]
Gerhardinger et al.

[11] Patent Number: 5,714,199
[45] Date of Patent: Feb. 3, 1998

[54] METHOD FOR APPLYING A POLYMER POWDER ONTO A PRE-HEATED GLASS SUBSTRATE AND THE RESULTING ARTICLE

[75] Inventors: Peter F. Gerhardinger, Toledo; Douglas M. Nelson, Curtis, both of Ohio

[73] Assignee: Libbey-Owens-Ford Co., Toledo, Ohio

[21] Appl. No.: 475,372

[22] Filed: Jun. 7, 1995

[51] Int. Cl.$^6$ .............................. B05D 3/10; B05D 3/02; B32B 27/38
[52] U.S. Cl. .............. 427/195; 427/165; 427/302; 427/314; 427/407.2; 428/413; 428/417; 428/912.2; 525/438; 525/523; 525/934
[58] Field of Search .................. 525/438, 523, 525/934; 428/413, 417, 912.2; 427/165, 195, 302, 314, 407.2

[56] References Cited

U.S. PATENT DOCUMENTS

| | | | |
|---|---|---|---|
| 4,210,687 | 7/1980 | Obendorf et al. | 428/417 |
| 4,528,127 | 7/1985 | Holderegger et al. | 525/530 |
| 4,828,900 | 5/1989 | Mouly | 428/192 |
| 5,021,297 | 6/1991 | Rhue et al. | 428/430 |
| 5,096,785 | 3/1992 | Somerhausen et al. | 428/912.2 |
| 5,247,395 | 9/1993 | Martinez | 359/883 |
| 5,252,402 | 10/1993 | Sanford | 428/418 |
| 5,330,602 | 7/1994 | Leach | 428/418 |
| 5,519,542 | 5/1996 | Yano et al. | 428/418 |

*Primary Examiner*—Randy Gulakowski
*Attorney, Agent, or Firm*—Marshall & Melhorn

[57] ABSTRACT

A method of forming a polymer backing on a glass substrate through the use of a pre-polymer powder applied onto the surface of the substrate. The backing is applied on-line in an existing substrate manufacturing or fabricating process while the substrate is at a high enough temperature to polymerize the powder. The resulting backed substrate is durable and abrasion resistant and exhibits excellent opacification and adhesion properties.

28 Claims, 3 Drawing Sheets

METHOD FOR APPLYING A POLYMER POWDER ONTO A PRE-HEATED GLASS SUBSTRATE AND THE RESULTING ARTICLE

BACKGROUND OF THE INVENTION

1. Field of the Invention

This invention relates to a process for applying on-line a coating or backing onto a substrate, and the resulting article. More particularly, this invention relates to a method for applying a polymer backing onto a glass substrate, preferably during the manufacturing of the substrate or subsequent fabrication thereof, which results in a high level of opacity in the finished article.

2. Summary of Related Art

Opaque backings are commonly applied to glass substrates, along with additional thin film reflective coatings, to modify characteristics of the glass for decorative, architectural, and automotive purposes. The backings are applied to opacify the glass which results in a mirrored finished article.

The known methods for applying backings to glass articles have generally involved painting processes. Typically, the painted backings are applied to the glass substrate after the production of the glass. This off-line process requires additional handling and equipment. The painting process involves covering one side of the glass with a solvent based paint. The painted substrate is then cured in a secondary cure oven to complete the backing process. The backing process is inefficient and costly because the painting is done off-line from the substrate manufacturing process.

Additionally, the use of solvent based paints presents environmental issues associated with emissions from the process and the subsequent disposal of waste materials. Paint processes require the use of organic solvents which suspend the paint pigments for application onto the substrate. The solvents generally are organic compounds which upon application and curing generate organic vapors. The vapors must be scrubbed or removed from the process ventilation stream emitted to the atmosphere. The vapor emission streams from the painting process are under heavy restrictions from environmental agencies. Furthermore, liquid or solid waste material generated from the solvent based processes requires additional environmental attention.

U.S. Pat. No. 4,528,127 discloses a composition for coating a substrate with a powder coating and a method of making matt finishes. The composition is made of a solid polyepoxide resin, a solid curing agent, and a catalyst which promotes the reaction between the polyepoxide resin and the curing agent. The patent further discloses the application of the powder onto various substrates including metal, glass, or plastic. The composition is applied to the substrate through electrostatic spraying and then cured at elevated temperatures over an extended period of time.

It would be advantageous to provide a method for opacifying a glass substrate on-line with a polymer backing while the substrate is still hot enough to polymerize the powder. It would be a further advantage to utilize a powder as a raw material in order to eliminate the environmental issues surrounding the utilization of paint processes and solvents for backing the glass article. Furthermore, it would be a significant cost advantage to apply a backing to a glass substrate on-line using an inexpensive raw material.

It is an object of the present invention to provide a process of applying a polymer backing to a glass substrate on-line. An on-line backing system improves the overall efficiency of the opacification process as compared to the processes presently known in the industry. Significant cost savings are attainable through such an on-line process.

A further object of the present invention is to utilize a silane adhesion promoter in the polymer powder. A silane compound in the powder improves the adhesion of the backing onto the glass substrate.

It is still a further objective to provide a backing process that can be utilized during the float glass manufacturing process or a subsequent fabrication operation, for example a glass tempering operation. Both glass processes provide hot glass substrates which allow the application of a polymer backing on-line and thereby eliminate additional heating and curing steps. An on-line polymer backing process enables application of the powder to either the top or the bottom surface of the substrate in the float glass line or onto the top surface of the substrate in a tempering glass line.

It is still a further objective to provide a backing process that eliminates the environmental issues associated with solvent based paints.

It is also an objective to strengthen the finished backed article by applying the polymer backing. The polymer backings improve the overall stability of the backed article as compared to the painted articles.

SUMMARY OF THE INVENTION

In accordance with the present invention, there is provided a process for forming a polymer backing on a glass substrate through the use of pre-polymer powder applied onto the surface of the substrate. The backing is applied on-line in an existing substrate manufacturing or fabrication process while the substrate is at a high enough temperature to polymerize the powder.

The method of the present invention is generally practiced in connection with the formation of a continuous glass ribbon substrate, for example during a float glass production process. However, the method of the present invention may be employed in applying polymer backings onto glass substrates either on-line or off-line. This includes a tempered glass line where the present invention may be practiced directly after the air quenching step when the substrate is still hot enough to polymerize the powder.

The present invention requires the use of a pre-polymer powder. The powder is delivered, at a temperature below its polymerization temperature, to a location near a substrate to be coated. The substrate, at the desired point of application, is at a temperature above the polymerization temperature of the powder.

The powder is then uniformly discharged onto either the top or the bottom of the moving glass substrate where it impinges on the glass. As the powder strikes the glass, it adheres to the glass substrate. The heat from the substrate causes the powder to polymerize and thereby form a solid backing on the substrate. The polymer quickly cures as the substrate drops in temperature during the normal cooling stage of the float glass ribbon process.

The backing on the finished article has a thick coating with a textured appearance. The backing is durable and abrasion resistant, and exhibits excellent opacification and adhesion properties.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
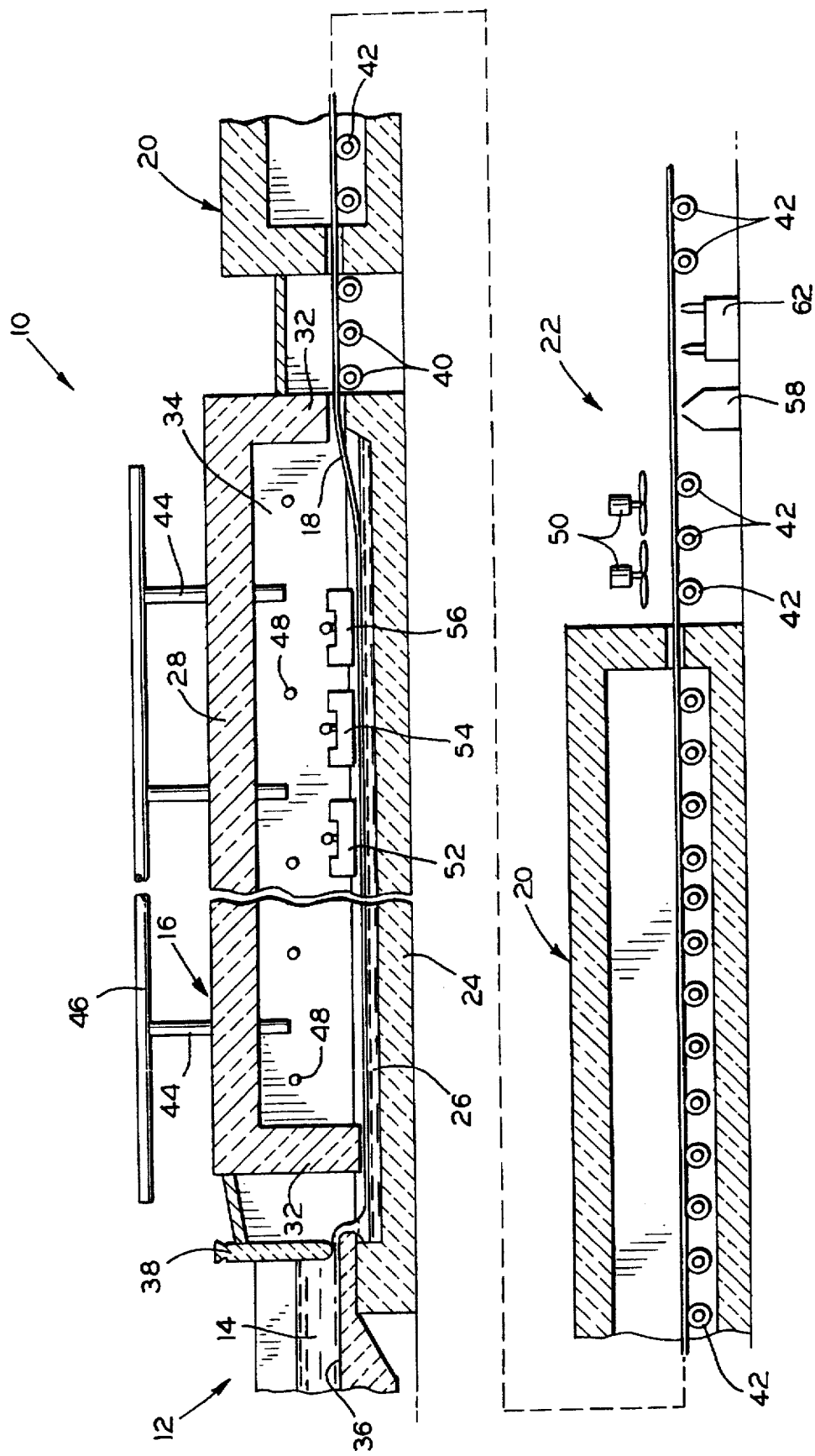
FIG. 1 is a schematic view of a vertical section of an apparatus for manufacturing a float glass ribbon which includes a fluidized bed suitably positioned to enable the practicing of the method of the present invention.

Referring now more particularly to the drawings, there is illustrated generally at 10 in FIG. 1 a float glass installation utilized as a means for practicing the method of the present invention. The float glass apparatus more particularly comprises a canal section 12 along which molten glass 14 is delivered from a melting furnace (not shown), to a float bath section 16 wherein a continuous glass ribbon 18 is formed in accordance with the well known float process. The glass ribbon 18 advances from the bath section 16 through an adjacent annealing lehr 20 and a cooling section 22. The continuous glass ribbon 18 serves as the substrate upon which the polymer backing of the present invention is applied.

The float section 16 includes a bottom section 24 within which a bath of molten tin 26 is contained, a roof 28, opposite sidewalls 30, and end walls 32. The roof 28, side walls 30, and end walls 32 together define an enclosure 34 in which a non-oxidizing atmosphere is maintained to prevent oxidation of the molten tin. Additionally, gas distributor beams 52, 54 and 56 are located in the bath section 16. Optionally, one of the beams may be in the lehr 20. The gas distributors beams 52, 54, and 56 employed to apply coatings onto the substrate prior to applying the polymer backing in accordance with the method of the present invention. The coatings may include, inter alia, silicon, silica, or metal oxides, such as tin oxide.

In operation, the molten glass 14 flows along the canal 36 beneath a regulating tweel 38 and downwardly onto the surface of the tin bath 26 in controlled amounts. On the tin bath the molten glass spreads laterally under the influences of gravity and surface tension, as well as certain mechanical influences, and it is advanced across the bath to form the ribbon 18. The ribbon is removed over lift out rolls 40 and is thereafter conveyed through the annealing lehr 20 and the cooling section 22 on aligned rolls 42.

A suitable non-oxidizing atmosphere, generally nitrogen or a mixture of nitrogen and hydrogen in which nitrogen predominates, is maintained in the bath enclosure 34 to prevent oxidation of the tin bath. The atmosphere gas is admitted through conduits 44 operably coupled to a distribution manifold 46. The non-oxidizing gas is introduced at a rate sufficient to compensate for normal losses and maintain a slight positive pressure, on the order of about 0.001 to about 0.01 atmosphere above ambient atmospheric pressure, so as to prevent infiltration of outside atmosphere. Heat for maintaining the desired temperature regimen in the tin bath 26 and the enclosure 34 is provided by radiant heaters 48 within the enclosure. The atmosphere within the lehr 20 is typically atmospheric air, while the cooling section 22 is not enclosed and the glass ribbon is open to the ambient atmosphere. Ambient air may be directed against the glass ribbon as by fans 50 in the cooling section. Heaters (not shown) may also be provided within the annealing lehr for causing the temperature of the glass ribbon to be gradually reduced in accordance with a predetermined regimen as it is conveyed therethrough. The application of the polymer backing of the present invention preferably takes place in the cooling section 22.

Figure 2:
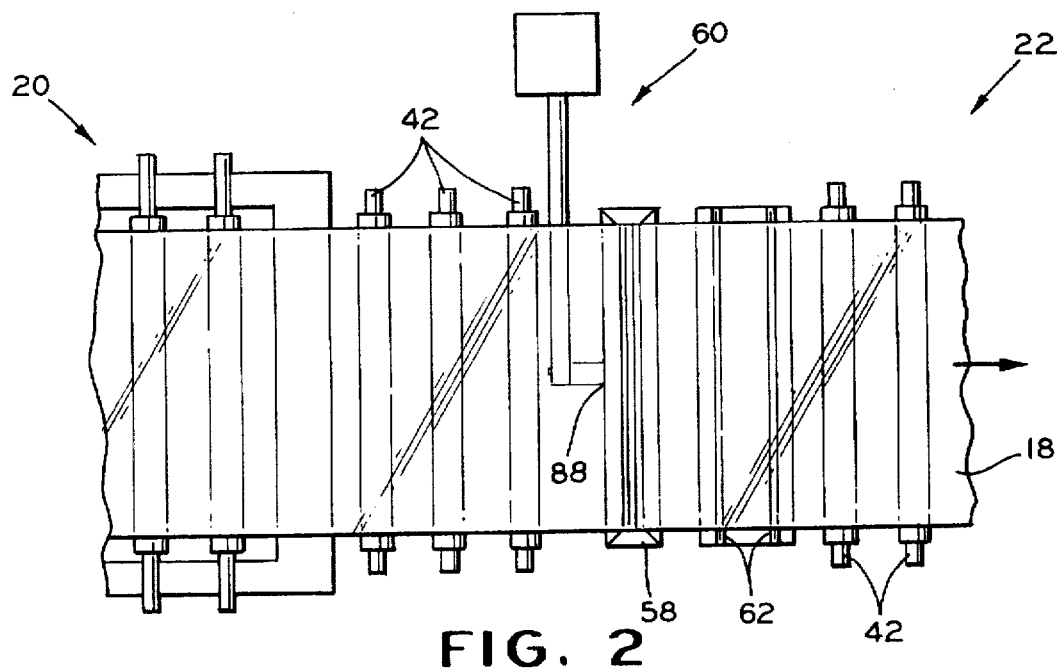
FIG. 2 is a top view of the fluidized bed positioned under the float glass ribbon.

In accordance with the present invention, a fluidized bed 58 may be utilized to apply a backing to either side of the float glass ribbon 18. FIG. 1 illustrates the use of a fluidized bed 58 positioned below the float glass ribbon 18 in the cooling section 22. The fluidized bed 58 is one type of apparatus that can be used in practicing the method of the present invention. The application device must be capable of dispersing a uniform cloud of powder evenly across the entire width of the substrate so that the finished article, upon polymerization of the powder, exhibits a uniform backing. The fluidized bed 58 is positioned in the cooling section 22 of the float glass process between aligned rolls 42. FIG. 2 is a top view illustrating the positioning of the fluidized bed 58 in the cooling section 22. A pre-polymer powder storage and conveying system 60 is utilized to deliver the powder to a powder inlet 88 on the fluidized bed 58. Upon application of the powder, the float glass ribbon 18 traverses across air knives 62 and back onto the aligned rolls.

Figure 3:
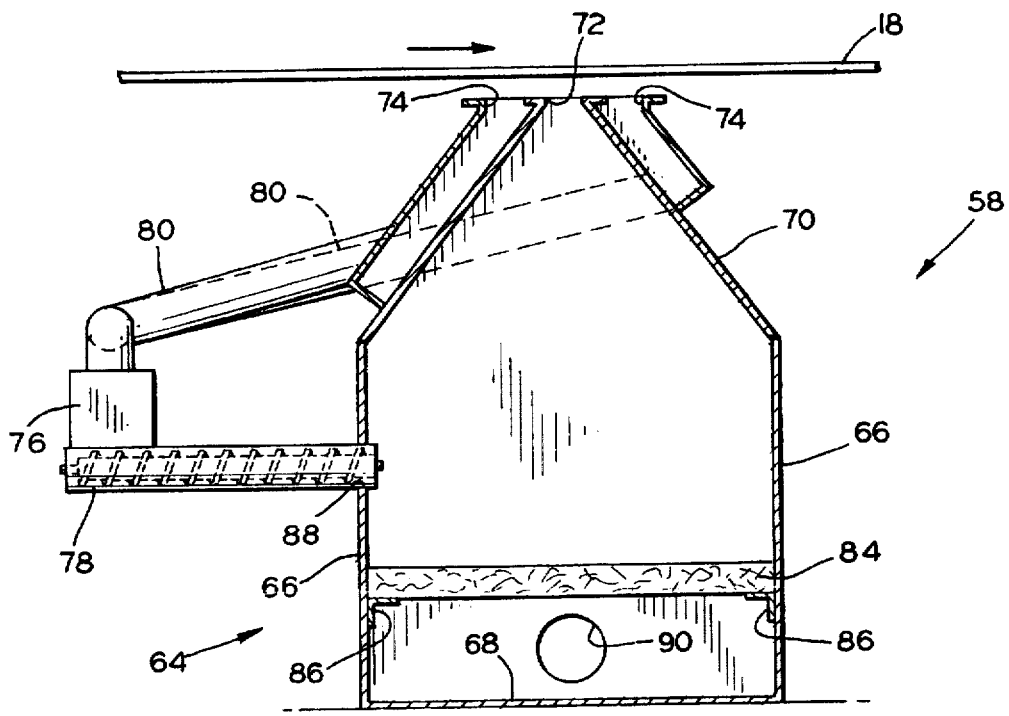
FIG. 3 is an enlarged schematic end view of a fluidized bed apparatus suitable for use in practicing the method of present invention to apply the powder to the bottom of a substrate.

The fluidized bed 58 is further illustrated in FIG. 3. The fluidized bed consists of a housing 64 having integral sides 66 and a bottom section 68. The fluidized bed differs from standard fluidized beds in that this particular bed has a removable inclined top section 70. The inclined top 70 permits the outflow of materials through a discharge slot 72 at the upper end. The apparatus is specifically designed to convey the material onto the surface of the substrate. Unused powder that does not adhere to the substrate and is not polymerized is returned to the fluidized bed through vacuum return slots 74 on either side of the discharge slot 72. The unused powder enters the vacuum return slots 74 and is then conveyed through channels 80 which feed the powder into a vacuum collection housing 76. The collection housing 76 returns the unused powder to the powder inlet conveyor 78.

Figure 4:
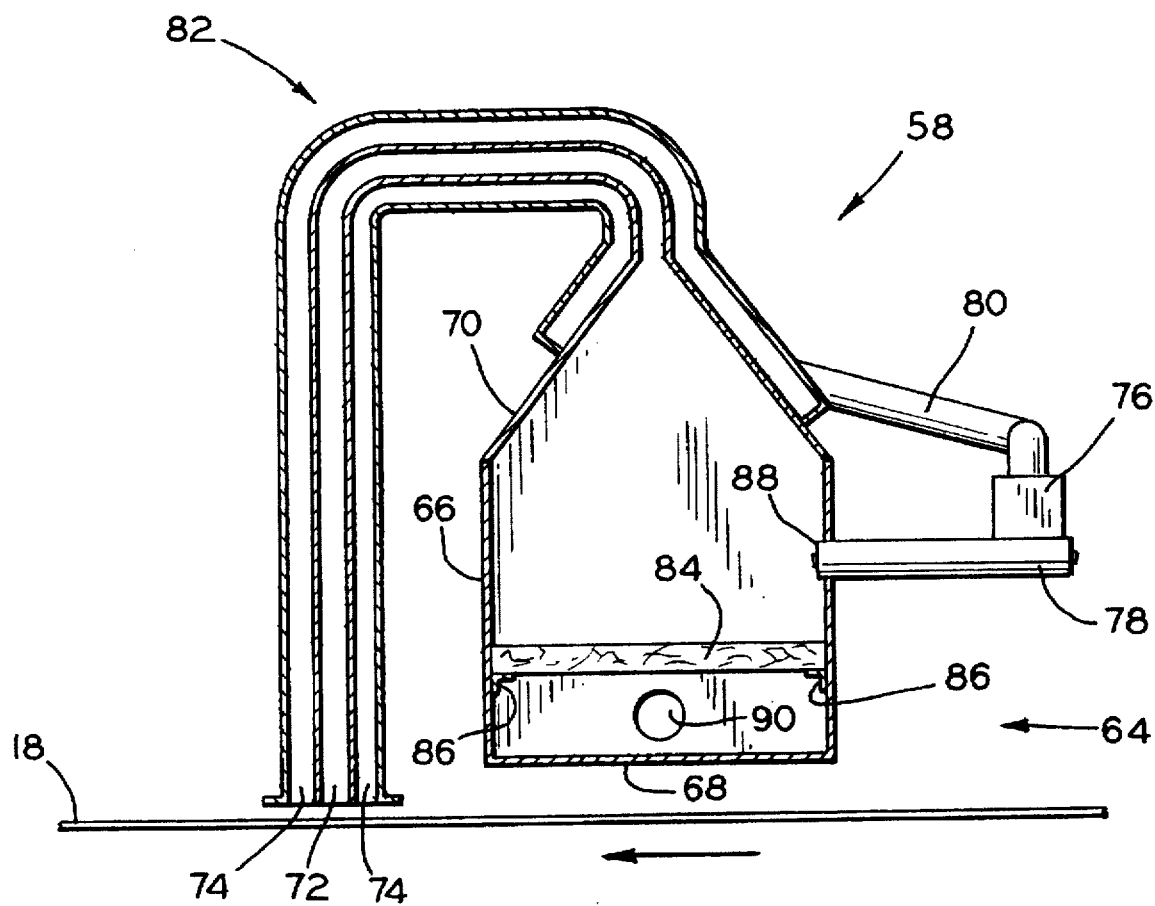
FIG. 4 is an enlarged schematic end view of a fluidized bed suitable for use in practicing the method of present invention to apply a powder to the top of a substrate.

Alternatively, the polymer backing may be formed on the top surface of a substrate. FIG. 4 depicts a fluidized bed 58 suitable for forming a polymer backing on the top surface of a substrate, such as the float glass ribbon. The fluidized bed of FIG. 4 works in a similar fashion as the bed of FIG. 3. The fluidized bed 58 of FIG. 4 utilizes a downward sloping top section 82 for discharging the powder onto the top surface of the substrate and for returning unused powder.

The fluidized beds in FIG. 3 and FIG. 4 have a porous membrane 84 fixed with brackets 86 at a distance from the bottom section 68 of the housing 64. A powder inlet 88 is positioned on one side of the housing 64 for the introduction of powder into the apparatus from the powder inlet conveyor 78. An air inlet 90 is positioned below the membrane 84 on the housing 64 to permit the introduction of compressed air.

Other forms of equipment may be used to convey the powder onto the glass substrate. The application equipment must disperse the powder in a uniform manner across the entire width of the substrate in order to completely coat the substrate and provide a uniform backing.

In practicing the method of the present invention, both thermoplastic and thermoset polymers can be utilized as backing materials. The pre-polymer must be in powder form and capable of full polymerization at the process temperatures of the substrate.

The preferred pre-polymer is an epoxy powder which upon polymerization results in a glossy cross-linked polymer backing. The epoxy is a fast cure epoxy obtained from the Pratt & Lambert Co., Buffalo, N.Y. under the designation #88-990. The chemical formulation is proprietary and is marketed under the tradename Vitralon®. It is essentially a quick cure black powder with minimal clay body filling agents and carbon-black pigments.

Alternatively, a hybrid epoxy/polyester powder can be applied which results in a polymer backing resistant to ultraviolet radiation. The hybrid epoxy/polyester powder is preferably applied to a tempered glass substrate for automotive applications.

Silane compounds are optionally added to the powder to improve the adhesion properties of the polymer. Silanes serve as coupling agents to improve the adhesion of organic resins to inorganic surfaces. Therefore, the silane compounds enhance the bonding of the polymer coating to the glass surface. Organofunctional silanes are used in practicing the present invention. The organofunctional silanes include glycidoxy silanes, amino silanes, mercapto silanes, and isocyanato silanes.

The preferred silane compound is 3-glycidoxypropyl-trimethoxysilane. This compound was obtained from the Dow Corning Corp., Midland, Mich. under the designation Z-6040 Silane®. The compound may be mixed with the Pratt & Lambert epoxy powder up to 5% by weight.

In accordance with the present invention, the substrate is generally a soda-lime-silica glass. The substrate can be a float glass ribbon or an annealed glass sheet for use in a tempering glass process. The glass substrate may also have additional coatings on the opposing side from where the backing is to be applied. With either substrate, it is important the that the temperature of the substrate, at the desired point of application, is above the polymerization temperature of the pre-polymer powder.

The temperature range of the substrate at the point of application of the powder is generally 300°–450° F. The upper limitation is established by the substrate production requirements in the float glass process. It is important that all critical annealing of the substrate is completed prior to applying the backing through the method of the present invention. Therefore, the upper limit is set at 450° F. to ensure that all objectionable stress is removed from the substrate. The lower limitation is established to ensure the quality of the polymer backing applied onto the substrate. The lower limitation will ensure that all of the pre-polymer powder applied to the substrate completely polymerizes.

In practicing the method of the present invention, the powder is conveyed to the area near the substrate to be coated. The conveying equipment can take various forms such as auger conveyors or air conveying systems. The powder is delivered to the application apparatus, such as the previously described fluidized beds depicted in FIGS. 3 and 4.

The application apparatus is used to apply a uniform curtain of powder onto the substrate. It is imperative that the powder be applied in a uniform fashion in order to obtain a finished article with an even and consistent polymer backing. Therefore, the dispersion apparatus must be capable of controlling the powder cloud density and velocity of the powder against the substrate under varying substrate flow and line speed conditions. This is particularly true with the float glass ribbon which travels at line speeds in excess of 300 inches per minute.

In the present invention, the powder sizing is an important operating parameter. the powder sizing impacts the thickness and consistency of the resulting polymer backing. Generally, a powder sizing range from about 20 to 120 microns is suitable for applying a polymer backing through the use of the fluidized beds depicted in FIGS. 3 and 4. The selection of a preferred sizing range for a given substrate and polymer is dependent upon the desired polymer thickness and the operating conditions involved with the manufacture or fabrication of the glass substrate at the point of application for the polymer backing. The preferred powder sizing to obtain an epoxy polymer backing on the float glass ribbon at a thickness of about 0.002 inches is a nominal 40 microns. Powders with a nominal sizing greater than 40 microns will result in a polymer backing thicker than the desired 0.002 inches. Powders that are finer than 40 microns will result in dust at the point of application and will not produce a backing at the desired thickness.

The powder cloud is controlled through the use of compressed air. The compressed air flows through the membrane of the fluidized bed and lifts the powder upward toward the opening slot in the top section of the fluidized bed.

In operation, the pre-polymer powder is conveyed into the fluidized bed 58 of FIG. 3 through the powder inlet 88. The compressed air flows through the air inlet 90 and the membrane 84 and lifts the powder above the membrane 84 to form a cloud. The cloud is then conveyed upward into the area near the inclined top 70. The inclined top 70 serves to direct the cloud of powder through the discharge slot 72 in a uniform flow across the width of the float glass ribbon 18. Adjustments in the air pressure vary the size and formation of the cloud and the powder discharge rate through the opening slot of the fluidized bed. For economic reasons, it is preferred to control the application apparatus so that the resulting backing has a thickness at the low end of the desired 0.002–0.008 inch range. Improved control and uniformity of the dispersed powder will allow thinner polymer backings.

The powder is directed toward the float glass ribbon 18 where it adheres and polymerizes to form the polymer backing. The unused material is pulled through the vacuum return slots 74 and returned directly to the fluidized bed 58 (not shown) or into the conveying system through the vacuum collection housing 76.

In the present invention, the backing process does not require a definitive curing step when using the fast cure epoxy. The temperature of the substrate causes the powder to polymerize as it adheres to the surface of the substrate. The curing of the polymer occurs as the substrate advances through the normal cooling stage associated with the float glass process.

In practicing the method of the present invention in the float glass process, air knives 62 are utilized when applying the powder to the bottom of the float glass ribbon 18, as indicated in FIG. 2. The air knives 62 enable skinning or solidification of the surface of the polymer while supporting the moving float glass ribbon 18. This prevents mask off or removal of the backing as the ribbon traverses the aligned rolls 42. The glass ribbon, having the polymer backing, is then further cooled during the normal processing stages to complete the finished article.

A similar application of a polymer backing can be utilized in a glass tempering process. A glass tempering process involves single sheets of pre-cut annealed glass. The sheets are conveyed through a heating oven then subjected to an air quench or tempering stage. The pre-polymer powder is applied to the glass sheet after the tempering stage but prior to the cooling stage when the substrate is about 300°–450° F. The substrate temperature range is limited for the same reasons specified in the float glass process. The apparatus depicted in FIG. 4 is utilized for applying the powder to the top surface of the substrate. The powder polymerizes on the substrate and then cures during the substrate cooling stage to form the polymer backing.

The resulting polymer backed substrate from the present invention is durable and abrasion resistant and exhibits excellent opacification and adhesion properties. Additionally, the light transmittance through the backing is less than 1% in the visible range.

The adhesion properties of the polymer backing on the substrate are the most important properties of the finished article. Therefore, the finished article is subjected to various tests to determine the level of adherence of the backing on the glass substrate. The resulting article is subjected to a water immersion test in which the substrate and backing are immersed in a deionized water at 50° C. for 250 hours. Upon removal from the de-ionized water, the backing is scribed or crosshatched with a knife, as per ASTM D3359. Tape is then applied to the backing and subsequently removed. Upon removal of the tape, the backing should remain on the substrate, which thereby indicates acceptable adhesion qualities.

In addition to the water immersion test, the backings are subjected to a high temperature/high humidity test. This test involves placing the backed article in an environment of 90° C. and 95% relative humidity for 1000 hours. Upon removal, the article is then subjected the same cross hatch test as utilized with the water immersion test.

Aesthetically, the resulting epoxy backed article of the present invention has a desirable glossy, textured finish. The texture of the backing is an inherent result of the method of the present invention. The textured finish is important as it lends to the application of further adhesives onto the backing for end use applications, such as mirrors.

Figure 5:
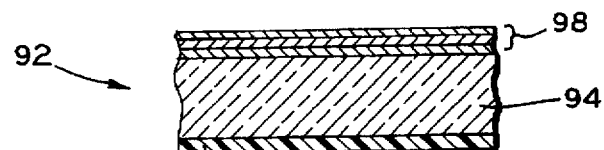
FIG. 5 is broken sectional view of a coated article according to this invention.

The finished product may have additional coatings on the opposite side of the glass substrate. FIG. 5 illustrates a finished article 92 having a glass substrate 94 with an epoxy backing 96 applied through the process of the present invention. Additionally, a plurality of coatings 98 are applied to the opposite side of the substrate to provide various transmittance and spectral properties to the finished article. These coatings generally involve various coating compositions applied in the float glass process through known chemical vapor deposition processes. The coatings provide specific reflective and abrasion resistant properties to the finished article. The coating processes form no part of the present invention.

The backing of the present invention results in a high level of opacity in the finished article. The high level of opacity permits the utilization of the finished article as a mirror for decorative, architectural and automotive purposes.

The method of the present invention eliminates the environmental issues involved with backing processes utilizing solvent bases paints. The present invention utilizes a raw material in a dry, powder. The powder, upon application, does not emit any hazardous vapors. Furthermore, the pre-polymer powders of the present invention do not generate additional hazardous solid waste upon application. The present invention therefore provides significant economic and environmental benefits.

The following examples, which constitute the best mode presently contemplated by the inventors for practicing the present invention, are presented solely for the purpose of further illustrating and disclosing the present invention, and are not to be construed as a limitation on, the invention:

EXAMPLE I

A float glass process was used in practicing the method of the present invention. A glass ribbon substrate having a bottom surface available for coating was produced from the process. The float glass process forms no part of the present invention.

An epoxy backing was applied to the bottom of the float glass ribbon in the area directly after the lehr and before the washing and inspection area on the float glass line. The backing was continuously applied to a 16 inch wide area across the bottom of the float glass ribbon. The temperature of the float glass at the area of application for the epoxy backing was about 310° F. The line speed of the float glass was 385 inches per minute.

The pre-polymer powder utilized in the present example was formulated by the Pratt & Lambert Co. and included 95% by weight of Pratt & Lambert's 88-990 fast cure epoxy powder and 5% by weight of Dow Corning Corporation's Z-6040 Silane®. A fluidized bed, similar to FIG. 3, was utilized to convey the powder onto the glass substrate. The fluidized bed was manually filled with the powder. The discharge rate of the powder from the fluidized bed was about 42 pounds per hour.

The fluidized bed had a sheet metal fluidizing hopper with a porous membrane. The hopper was covered with a removable top section which had inclined walls. The width of the fluidized bed was 12 inches and the total height, including the removable top section, was 18 inches high. The fluidized bed along with the top section was 16 inches long. The inclined walls angled toward each other near the top of the enclosure to form a ¾ inch opening or discharge slot which ran the entire 16 inch length of the top section. Two return slots were positioned on each side of the opening on the top section. The slots were connected to a vacuum system in order to return unused powder back to the fluidized bed.

The fluidized bed was mounted below the float glass with the longitudinal opening positioned transversely across the traveling float glass. The ¾ inch opening was placed about ½ inch away from the float glass substrate. The bed was carefully leveled to achieve uniform distribution of the powder cloud across the width of the substrate. Compressed air was used to fluidize the epoxy powder to form a cloud of material in the bed. The air was maintained at a relative humidity below 25%, a temperature of 60° F. and, a pressure of 10 psi. The inclined walls directed the fluidized cloud of epoxy powder and conveyed it through the ¾ inch discharge slot on the top section. The powder was conveyed onto the float glass where it cured to form a thermoset epoxy coating on the glass substrate. The excess powder that did not adhere to the float glass was returned to the fluidized bed through the vacuum system. A cooling fan was inserted adjacent to the fluidized bed in order to keep the temperature of the bed below the polymerization temperature of the powder.

The resulting epoxy backing on the float glass was of nominal 0.001 inch thickness. The glossy backing had well defined edges with a uniform thickness across the backed portion of the glass. The coating exhibited minimal roll mask off or removal of the polymer as the backed substrate moved across the aligned rolls in the cooling section of the float glass process.

The resulting article was subjected to both of the previously described adhesion tests. The results of both tests indicated acceptable adhesion qualities. Additionally, the resulting article had a light transmittance of less than 1% in the visible range.

EXAMPLE II

The same procedure and operating parameters as described in Example I was generally duplicated in this Example. The fluidized bed was filled with a greater volume of pre-polymer powder used in Example I. The volume of fluidizing air was increased in order to compensate for the greater volume of powder in the fluidized bed.

The resulting glossy epoxy backing was heavier in film build than the first example. The backing was uniform in coverage over the substrate and exhibited a thickness of approximately 0.008 inches. The backing had some minor variations in thickness in the longitudinal direction of the glass.

EXAMPLE III

An annealed glass substrate was provided for the use in the present Example. The glass substrate was heated to a temperature of 350° F. in a conveyor furnace. The conveyor furnace was used in the laboratory to simulate the backing application conditions of a float glass process in order to test the method of the present invention. The furnace utilized in-line rollers to convey a glass substrate through a heating zone prior to practicing the method of the present invention.

Dow Corning Corporation's Z-6040 Silane® was then sprayed onto the hot glass substrate as an adhesion promoter. A milled polyvinyl chloride powder was then immediately applied onto the top of the substrate. The powder was manually applied in a uniform manner. The polyvinyl chloride powder polymerized on the substrate to form a polymer backing. The polymer backing cured as the glass substrate cooled to room temperature. The opacified finished article had a visible light transmittance of less than 1%. The resulting article was subjected to the water immersion test previously described. The polyvinyl chloride backing exhibited acceptable adhesion properties.

In accordance with the provisions of the patent statutes, the present invention has been described in what is considered to represent its preferred embodiment. However, it should be noted that the invention can be practiced otherwise than as specifically illustrated and described without departing from its spirit and scope.

What is claimed is:

1. A process for applying a polymer backing onto a glass substrate, comprising the steps of:
  (a) providing a pre-polymer powder;
  (b) conveying said powder to a point near a float glass ribbon to be coated, said float glass ribbon being at a temperature above the polymerization temperature of said powder; and
  (c) discharging said powder onto said float glass ribbon wherein said powder polymerizes to form a backing on said float glass ribbon.

2. A process for applying a polymer backing onto a glass substrate as recited in claim 1, wherein said float glass ribbon is at a temperature of about 300°–450° F.

3. A process for applying a polymer backing onto a glass substrate as recited in claim 1, wherein said pre-polymer powder is an epoxy powder.

4. A process for applying a polymer backing onto a glass substrate as recited in claim 1, wherein said pre-polymer powder is a polyvinyl chloride powder.

5. A process for applying a polymer backing onto a glass substrate as recited in claim 1, wherein said pre-polymer powder contains an organofunctional silane adhesion promoter selected from the group consisting of amino silane, mercapto silane, glycidoxy silane, or isocyanato silane.

6. A process for applying a polymer backing onto a glass substrate as recited in claim 1, wherein said powder has a nominal powder sizing of about 20–120 microns.

7. A process for applying a polymer backing onto a glass substrate as recited in claim 1, wherein said backing on said glass substrate has a visible light transmittance of less than 1%.

8. A process for applying an epoxy backing onto a glass substrate, comprising the steps of:
  (a) providing an epoxy powder;
  (b) conveying said powder to a point near a float glass ribbon to be coated, said float glass ribbon being at a temperature above the polymerization temperature of said epoxy powder; and
  (c) discharging said epoxy powder onto said float glass ribbon wherein said epoxy powder polymerizes to form a thermoset epoxy backing on said float glass ribbon.

9. A process for applying an epoxy backing onto a glass substrate as recited in claim 8, wherein the epoxy powder contains an organofunctional silane as an adhesion promoter, said organofunctional silane being selected from the group consisting of amino silane, mercapto silane, glycidoxy silane, or isocyanato silane.

10. A process for applying an epoxy backing onto a glass substrate as recited in claim 8, wherein the organofunctional silane is 3-glycidoxypropyl-trimethoxysilane in a quantity of up to 5% by weight of the total powder.

11. A process for applying an epoxy backing onto a glass substrate as recited in claim 8, wherein said float glass ribbon is at a temperature of about 300°–450° F.

12. A process for applying an epoxy backing onto a substrate as recited in claim 11, wherein said epoxy powder is an epoxy polyester hybrid and the resulting thermoset backing provides ultraviolet radiation resistance.

13. A process for applying an epoxy backing onto a float glass ribbon during its manufacture, comprising the steps of:
  (a) providing a epoxy powder including an organofunctional silane adhesion promoter selected from the group consisting of amino silane, mercapto silane, glycidoxy silane, or isocyanato silane;
  (b) conveying said powder to a point near a float glass ribbon to be coated, said float glass ribbon being at a temperature of about 300°–450° F., said temperature being above the polymerization temperature of said epoxy powder; and
  (c) discharging said epoxy powder onto said float glass ribbon wherein said epoxy powder polymerizes to form a thermoset epoxy backing on said glass substrate.

14. A process for applying an epoxy backing onto a float glass ribbon according to claim 13, wherein said glycidoxy silane is 3-glycidoxypropyl-trimethoxysilane in a quantity of up to 5% by weight of the total powder.

15. A process for applying an epoxy backing onto a float glass ribbon according to claim 13, wherein said float glass ribbon has a silica coating deposited onto the side of said float glass ribbon opposite to that which said backing is applied.

16. A process for applying an epoxy backing onto a float glass ribbon according to claim 13, wherein said float glass ribbon has a silicon coating and then a silica coating deposited onto the side of said float glass ribbon opposite that to which said backing is applied.

17. A process for applying an epoxy backing onto a float glass ribbon according to claim 13, wherein said powder has a nominal powder sizing of about 20–120 microns.

18. A process for applying an epoxy backing onto a float glass ribbon according to claim 13, wherein said powder has a nominal powder sizing of about 40 microns.

19. A process for applying an epoxy backing onto a float glass ribbon according to claim 13, wherein said backing on said glass substrate has a visible light transmittance of less than 1%.

20. A process for applying an epoxy backing onto a float glass ribbon according to claim 13, wherein said backing has a thickness of about 0.002–0.008 inches.

21. A substrate having a polymer backing thereon prepared by the process of claim 1.

22. A substrate having an epoxy backing thereon prepared by the process of claim 13.

23. A process for applying a polymer backing onto a glass substrate, comprising the steps of:

(a) providing a pre-polymer powder;

(b) conveying said powder to a point near a tempered glass sheet to be coated, said tempered glass sheet being at a temperature above the polymerization temperature of said powder; and (c) discharging said powder onto said tempered glass sheet wherein said powder polymerizes to form a backing on said tempered glass sheet.

24. A process for applying a polymer backing onto a glass substrate as recited in claim 23, wherein said tempered glass sheet is at a temperature of about 300°–450° F.

25. A process for applying a polymer backing onto a glass substrate as recited in claim 23, wherein said pre-polymer powder is an epoxy powder.

26. A process for applying a polymer backing onto a glass substrate as recited in claim 23, wherein said pre-polymer powder contains an organofunctional silane adhesion promoter selected from the group consisting of amino silane, mercapto silane, glycidoxy silane, or isocyanato silane.

27. A process for applying a polymer backing onto a glass substrate as recited in claim 23, wherein said powder has a nominal powder sizing of about 20–120 microns.

28. A process for applying a polymer backing onto a glass substrate as recited in claim 23, wherein said backing on said glass substrate has a visible light transmittance of less than 1%.

* * * * *